United States Patent [19]

Barrows

[11] Patent Number: 5,905,979
[45] Date of Patent: May 18, 1999

[54] ABSTRACT MANAGER SYSTEM AND METHOD FOR MANAGING AN ABSTRACT DATABASE

[75] Inventor: Sue Ellen Barrows, Rockwall, Tex.

[73] Assignee: Electronic Data Systems Corporation, Plano, Tex.

[21] Appl. No.: 08/673,868

[22] Filed: Jul. 2, 1996

[51] Int. Cl.[6] .................................................. G06F 17/30
[52] U.S. Cl. ............................. 707/1; 707/500; 707/501; 707/513; 707/100
[58] Field of Search ................................... 707/9, 100, 1, 707/500, 501, 513

[56] References Cited

U.S. PATENT DOCUMENTS

| 5,193,192 | 3/1993 | Seberger | 707/5 |
|---|---|---|---|
| 5,457,792 | 10/1995 | Virgil et al. | 707/5 |
| 5,572,643 | 11/1996 | Judson | 395/793 |
| 5,577,241 | 11/1996 | Spencer | 707/5 |
| 5,640,558 | 6/1997 | Li | 707/102 |
| 5,657,259 | 8/1997 | Davis et al. | 364/15.03 |
| 5,671,283 | 9/1997 | Michener et al. | 380/25 |
| 5,673,322 | 9/1997 | Pepe et al. | 348/49 |
| 5,675,637 | 10/1997 | Szlam et al. | 379/142 |
| 5,675,745 | 10/1997 | Oku et al. | 395/207 |
| 5,678,041 | 10/1997 | Baker et al. | 395/609 |
| 5,696,898 | 12/1997 | Baker et al. | 395/187.01 |

OTHER PUBLICATIONS

Baker, Hypertext Browsing on the Internet, Unix Review, V.12, No. 9, pp. 21–26, Sep. 1994.
McArthur, World Wide Web &HTML Forms, Dr. Dobb'ss journal, Dec. 1994.
Davison, coding with HTML Forms, Dr. Dobb's Journal, pp. 70–75, 106–109, Jun. 1995.

Primary Examiner—Paul V. Kulik
Assistant Examiner—Jean M. Corrielus
Attorney, Agent, or Firm—T. Murray Smith; L. Joy Griebenow

[57] ABSTRACT

An abstract manager system (12) and method for managing an abstract database (40) are provided. The abstract manager system (12) may be implemented using a computer that includes a mass storage device (44) and a processor (34). The processor (34) is responsive to one or more computer files stored in the mass storage device (44) such as an abstract manager program (32). The processor (34) is responsive to generate an abstract manager input form (96) and to receive input abstract information in the abstract manager input form (96). The processor (34) is also responsive to generate a record in an abstract database (40) that includes the input abstract information and to generate a file, such as an abstract file of abstract files (42), that includes the input abstract information.

13 Claims, 10 Drawing Sheets

FIG. 4

Abstract Manager

File　　Help

[Create New Abstract] — 54　　[Web Browser] — 56

View abstracts by: — 58
- ○ Articles　○ Journals
- ○ Audios　○ Videos
- ○ Books
- ⦿ All media

Sort By: — 60
- ⦿ Title
- ○ Author

[ORG] — 62

📚 View all abstracts — 64

📠 View all abstracts created by users organization. — 66

👥 View all unfinished abstracts created by users organization. — 68

[Update] — 70

| Media Type | Author | Title | Sub-Title | Publisher |
|---|---|---|---|---|
| Journal | Barrow, Sue | Organization | | Technical |
| Book | Jones, Robert | Competition | In a Global World | Jones |
| Book | Ward, John | Style | | Wilson |
| Book | Jelks, Lisa | Technical Writing | | Business |
| Book | Balch, Dawn | Hierarchy | | Business |

— 72

— 52

FIG. 6

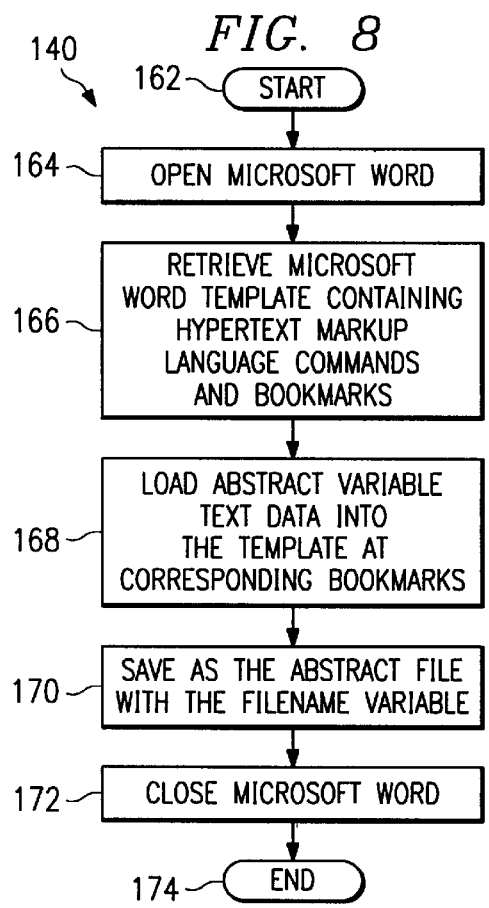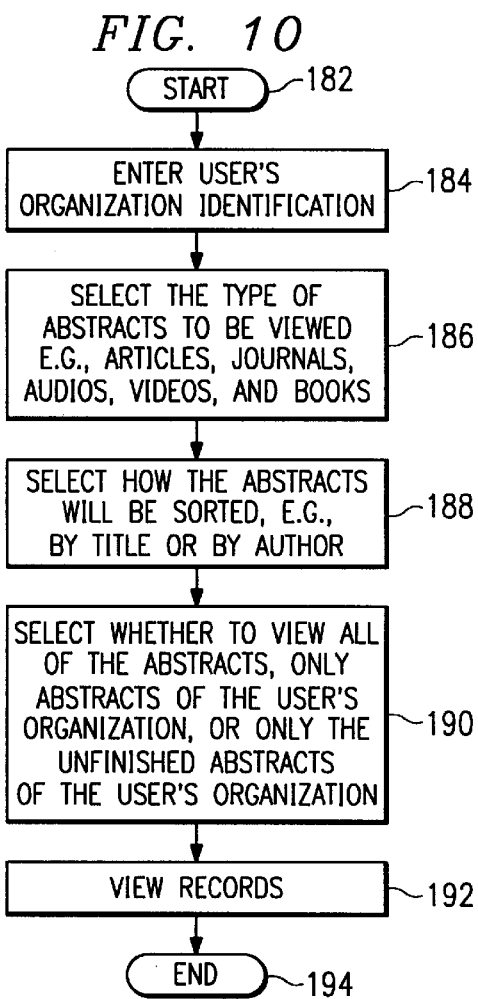

FIG. 9

The Fifth Discipline:
The Art and Practice of The Learning Organization

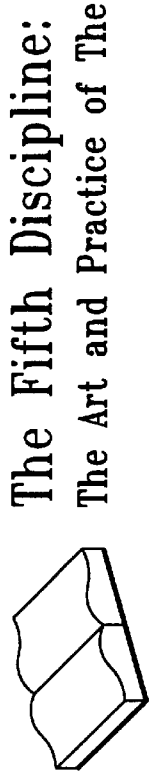

| Author | Publisher | Publication Date | ISBN# | Available? |
|---|---|---|---|---|
| Senge, Peter M. | New York: Doubleday/Currency | August, 1990 | 0385260946 | No |

 Share your thoughts about this book in a secured discussion. This discussion is only open to authorized participants.

Abstract

This book discusses the following topics:

- ☐ Organizational effectiveness
- ☐ Work groups
- ☐ Organization and administration
- ☐ Efficiency
- ☐ Learning Its theme is that corporations must become learning organizations to survive and prosper, yet many operate with 'learning disabilities' that block survival and growth. The book offers ways leaders can eliminate or seek to eliminate those learning disabilities through mastery of five disciplines: personal mastery, mental models, shared vision, team learning, and systems thinking.

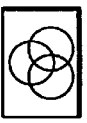

195 total accesses. 16 accesses this month.
Last Update: Thusrday, 30-May-96 16:04:42 CDT 5,905,979

ABSTRACT MANAGER SYSTEM AND METHOD FOR MANAGING AN ABSTRACT DATABASE

NOTICE

"Copyright 1996 Electronic Data Systems Corporation." A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD OF THE INVENTION

This invention relates generally to the field of information processing and more particularly to an abstract manager system and method for managing an abstract database.

BACKGROUND OF THE INVENTION

The Internet and other commercially available computer networks and information providers (collectively "the Internet") are growing in popularity and importance. The Internet is being used throughout the world by businesses, groups, and individuals to exchange information, conduct business, and for entertainment. The Internet is becoming more and more important to commerce as businesses throughout the world are establishing a presence on the Internet by setting up home pages and web pages that are accessible to users throughout the world.

The Internet, which is also referred to as the World Wide Web, is an interconnection of computer servers located throughout the world. Individual computer users ("users") may access these servers from virtually anywhere in the world. A user accesses a web page by entering a uniform resource locator (URL) which identifies that particular web page. These web pages may be stored in servers located throughout the world. In this manner, information can be easily disseminated throughout the world.

Generally, a user accesses the Internet by executing a "web browser" or "parser" program locally at a client and interconnecting to the server of an Internet service provider. The interconnection may be through a telephone communications link or through a dedicated communications link, such as an Integrated Services Digital Network ("ISDN"). The web browser is a computer program that allows the user's computer to act as a terminal operating from the server. Web browsers, such as those sold under the trademarks NETSCAPE NAVIGATOR and NCSA MOSAIC, allow users to conveniently access and navigate the Internet through a graphical user interface. Web browsers are located on the user's computer and use a language or protocol to communicate. Most web browsers use a language called Hypertext Markup Language ("HTML") to communicate with a server so that web pages may be displayed.

Server operators, developers, and Webmasters are able to use the HTML language to create graphical interface pages called web pages or home pages. Each web page is assigned a URL so that users may access a desired web page by entering its unique URL. Many web pages also provide various graphical icons that, if selected, will automatically access another web page. In this manner, users may conveniently navigate the Internet by simply using their mouse and "clicking" on a graphical icon or a link that will automatically take them to a desired web page. Both NETSCAPE NAVIGATOR and NCSA MOSAIC are known as "forms-capable browsers" because they can interpret HTML files which provide on-screen interactive forms, including fill-in text boxes, option buttons, and drop-down list boxes, and allow a user to interact with a web page.

More recently, companies and organizations have begun designing internal computer networks that operate like the Internet but are limited to a particular company or organization. These computer networks are referred to as "intranets." Intranets provide an added level of security so that information may be exchanged and disseminated between corporate employees or organization members in a manner that is similar to using the Internet without making the information available to the entire world. Intranets also use web browsers, such as NETSCAPE NAVIGATOR, and allow users to retrieve web pages identified by a unique address. In this way, companies and organizations may easily disseminate information in a manner that is convenient and familiar without making such information available to the world through the Internet.

Information is often made available using the Internet and intranets using web pages or information files that may be displayed by a web browser or the like. These files are formatted so that a web browser may interpret the files and display a corresponding web page for each file. For example, information may be provided in a file that is formatted in HTML format so that an HTML compatible web browser may receive the file, process the file, and display a corresponding graphical interface page or web page.

Problems arise when attempting to create, update, and maintain large numbers of these web pages or information files. Web pages often become outdated with inaccurate information and must be updated so that the latest information is available to the users. If the creation and update of these web pages are not properly managed, duplicate web pages may be created resulting in inaccurate and possibly conflicting information being provided to Internet or intranet users. Problems also arise when attempting to provide updated web pages that present information in a uniform and consistent format that Internet or intranet users come to rely upon and expect.

SUMMARY OF THE INVENTION

From the foregoing it may be appreciated that a need has arisen for an abstract manager system and method for managing an abstract database so that computer files, such as web pages or information files, containing abstract information and the like may be easily created, updated, and maintained. In accordance with the present invention, an abstract manager system and method are provided that allow a user to create, update, and maintain web browser compatible files containing abstract information. These files may be provided on the Internet or on a computer network, such as a corporate intranet, and present information in a uniform and consistent manner. This allows accurate and timely information to be maintained and provided to users of computer networks in the form of web browser compatible files.

According to an embodiment of the present invention, there is provided an abstract manager system using a computer that includes a storage medium for storing at least one computer file and a processor. The processor being responsive to one or more of the computer files of the storage medium to generate an abstract input form and to receive input abstract information in the abstract input form. The processor also responsive to generate a record in an abstract database and a file that includes the input abstract information. The file may be provided in a form that is capable of being interpreted by a parser program or web browser program so that the input information may be viewed by a user on a network.

The present invention provides various technical advantages. A technical advantage of the present invention allows non-technical personnel to quickly and conveniently create web browser compatible files. Another technical advantage of the present invention includes the ability to easily manage large collections of web browser compatible files and ensure that duplicate files are not generated thus preventing the creation of redundant files having potentially inconsistent and inaccurate information. Yet another technical advantage of the present invention includes the creation of web browser compatible files that present information in a consistent, recognizable format. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description, wherein like reference numerals represent like parts, in which:

FIG. 4 is an exemplary abstract manager main menu of the abstract manager system;

FIG. 5 is an exemplary abstract manager input form for receiving input abstract information;

FIG. 6 is an exemplary article abstract manager input form for receiving input abstract information describing an article;

FIG. 8 is a flowchart illustrating an exemplary method for generating an abstract file in web browser format;

FIG. 9 is an exemplary output display of a web browser displaying an abstract file provided in web browser format;

FIG. 10 is a flowchart illustrating a method for viewing records of an abstract database;

DETAILED DESCRIPTION OF THE INVENTION

Turning first to the nomenclature of the specification, the detailed description which follows is represented largely in terms of processes and symbolic representations of operations by conventional computer components, including a processor associated with a general purpose computer system, memory storage devices for the processor, and connected pixel-oriented display devices. These operations include the manipulation of data bits by the processor and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process or method is generally conceived to be a sequence of computer-executed steps leading to a desired result. These steps generally require manipulations of physical quantities. Usually, although not necessarily, these quantities take the form of electrical, magnetic, or optical signals capable of being stored, transferred, combined, compared or otherwise manipulated. It is conventional for those skilled in the art to refer to these signals as bits, values, elements, symbols, characters, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc., which are often associated with manual operations performed by a human operator. It must be understood that no involvement of a human operator is necessary or even desirable in the present invention. The operations described herein are machine operations performed in conjunction with a human operator or user that interacts with the computer.

In addition, it should be understood that the programs, processes, methods, etc. described herein are not related or limited to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hardwired logic or programs stored in non-volatile memory, such as read only memory.

Figure 1:
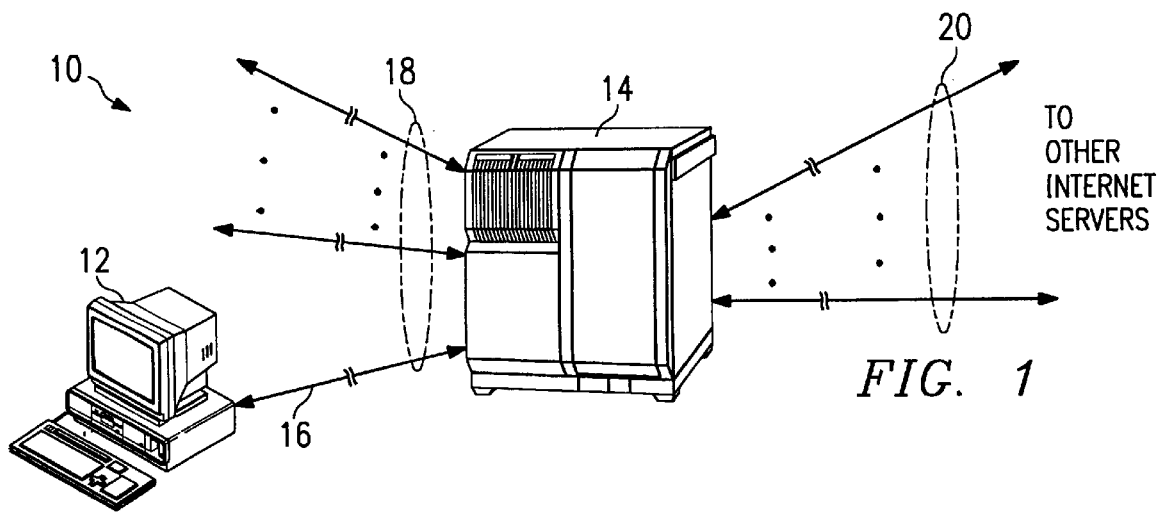
FIG. 1 is an overview diagram illustrating a network interconnection between an abstract manager system and an Internet server.

Referring now in more detail to the drawings, FIG. 1 is a diagram illustrating a network interconnection 10 between an abstract manager system 12 and a server 14, such as an Internet server, through a direct communication line 16. In the embodiment shown in FIG. 1, abstract manager system 12 is implemented using a personal computer or client computer and is illustrated more fully in FIG. 2. Server 14 may also interconnect with other client computers, similar to the interconnection with abstract manager system 12, through a plurality of direct communication lines 18.

Network interconnection 10 also includes an interconnection or interface between server 14 and other Internet servers through a plurality of communication lines 20. In this manner, server 14 allows the client computers directly interconnected with server 14 through direct communication lines 18 to communicate with other Internet users by providing an interconnection to other Internet servers through the plurality of communication lines 20. The other Internet users may also directly interconnect with a server such that a communication path may be established between one client computer and another client computer through the various servers of the Internet.

Server 14 is a computer such as a personal computer, file server, workstation, minicomputer, mainframe, or any other computer capable of communicating and interconnecting with other computers. Server 14 will generally include a processor, a printer, a keyboard, a monitor, a floppy disk drive, a memory, a modem, and a mass storage device such as a hard disk drive. Direct communication line 16, direct communication lines 18, and communication lines 20 may be any type of communications link including a telephone communications link or a dedicated link such as an ISDN line.

In operation, abstract manager system 12 is used to create, update, and maintain various abstract files. Thus, the abstract manager system 12 is capable of serving as an operater input apparatus. The abstract files are provided in a web browser compatible format such as HTML and contain abstract information. The abstract files may be displayed using a web browser. The information provided in these files is presented in a uniform and consistent format from one abstract file to another.

The abstract files may be provided to server 14 through direct communication line 16. In this manner, other Internet users throughout the world may access and view these files using a web browser program or the like. Each abstract file is created and stored in a directory with a unique filename so that each abstract file may be individually accessed.

Although network interconnection 10 has been illustrated and described in FIG. 1 as being a node or interconnection on the Internet, network interconnection 10 may be any interconnection found on any computer network such as a local area network ("LAN"), a wide area network ("WAN"), a corporate intranet, or any other type of network.

Figure 2:
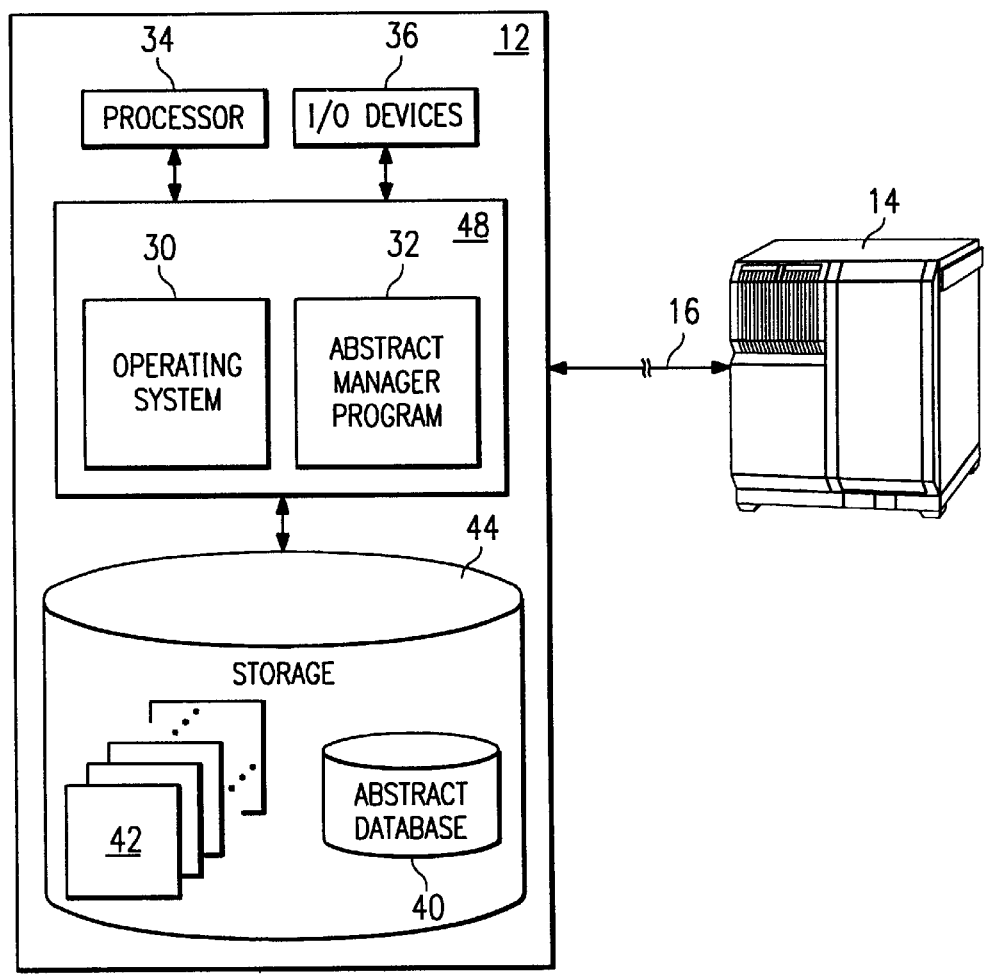
FIG. 2 is a block diagram illustrating the abstract manager system in more detail.

FIG. 2 is a block diagram illustrating abstract manager system 12 in more detail. Server 14 is also shown coupled to abstract manager 12 through direct communication line 16. Abstract manager system 12 may be implemented using a computer that includes a processor 34, such as an INTEL or MOTOROLA microprocessor, a memory 48, such as a random access memory ("RAM"), various I/O devices 36, and a mass storage device 44, such as a hard disk drive used to store abstract files 42 and an abstract database 40. I/O devices 36 may be any peripheral that allows data to be exchanged with abstract manager system 12 and may include such things as a keyboard, a pointing device, such as a mouse, a monitor, a graphics tablet, a modem, and the like. Abstract manager system 12 may be implemented using a personal computer operating under the control of an operating system such as those sold under the trademarks WINDOWS, WINDOWS 95, WINDOWS NT, OS/2, DOS, XENIX, or other operating systems.

Abstract manager system 12 includes an operating system 30 shown stored in memory 48. Operating system 30 is a master control program that manages and controls the internal functions and operations of abstract manager system 12. Operating system 30 must also acknowledge and respond to requests from the devices of I/O devices 36 and to mass storage device 44. Operating system 30 may be implemented using virtually any operating system, such as those mentioned above.

Operating system 30 and an abstract manager program 32 may be stored in mass storage device 44 and provided to memory 48. Mass storage device 44 may be a hard disk drive commonly found and used in personal computers. Operating system 30 is preferably loaded into memory 48 during initialization or boot-up of abstract manager system 12. Abstract manager program 32 may then be loaded into memory 48 either automatically during initialization or after being selected by a user. The user of abstract manager system 12 may include non-technical personnel.

Processor 34, under the control of operating system 30, is used to retrieve, process, store, and display data. Processor 34 communicates control, address, and data signals with operating system 30 and with other components of abstract manager system 12 through a system bus. Processor 34 may include an arithmetic logic unit used to assist processor 34 in performing mathematical operations. Processor 34 interprets and executes instructions that have been fetched or retrieved from memory 48, such as from abstract manager program 32, and may be implemented as a single integrated circuit or as a combination of integrated circuits.

Abstract manager program 32 is an application program and is shown loaded into memory 48 along with operating system 30. The instructions of abstract manager program 32 are provided to processor 34 which is used to execute the instructions provided from memory 48. Abstract manager program 32 allows a user of abstract manager system 12 to create, update, and maintain any number of abstract files 42 as shown stored in mass storage device 44 of FIG. 2. Abstract files 42 may be provided in web browser compatible format, such as HTML format, so that the files may be displayed using a web browser. Each abstract file stores input abstract information which may include such information as author, title, sub-title, publisher, publication, publication date, volume number, page number, availability information, summary information, classification information, media type, filename, status information, and the like. Abstract files 42 may be provided from abstract manager system 12 to server 14 through direct communication line 16. After abstract files 42 have been uploaded to server 14, other users may access and display abstract files 42 using a web browser or parser program.

Web browsers provide a graphical user interface and allow a user to view in-line images, fonts, and document layouts. Web browsers are also known as parsers which convert large units of data into smaller, more easily interpreted pieces. A parser reads the tagged text of information files or web pages, such as abstract files 42, and formats the various portions of the files for on-screen display. For example, a web browser reads information files or web pages that have been prepared with a markup language, such as HTML. An example of an abstract file provided in HTML format is provided below in Appendix A. The markup language identifies the parts of the file, such as document headings, bulleted lists, or body text, but says nothing about how these parts should appear on-screen. The web browser then reads the text and formats the various parts of the information file for on-screen display.

Abstract manager program 32 also generates a record in an abstract database 40 for each generated abstract file of abstract files 42. Each record of abstract database 40 includes input abstract information included in the corresponding file of abstract files 42. Abstract manager program 32 may also access and retrieve a record from abstract database 40 so that the record may be edited or updated with input abstract information. After a record is retrieved and edited or updated, abstract manager program 32 generates another abstract file. This abstract file is stored in place of the previous abstract file of abstract files 42 having the same filename to prevent inaccurate and outdated information from being provided.

Abstract manager program 32 may be implemented using any of the variety of computer programming languages and may provide a graphical user interface such as those seen in WINDOWS compatible applications. For example, abstract manager program 32 may be developed using a software development product such as that sold under the trademark MICROSOFT VISUAL BASIC. The graphical user interface will allow a user to conveniently navigate the various forms and screens of abstract manager program 32 by selecting various options using a pointing device such as a mouse.

Figure 3:
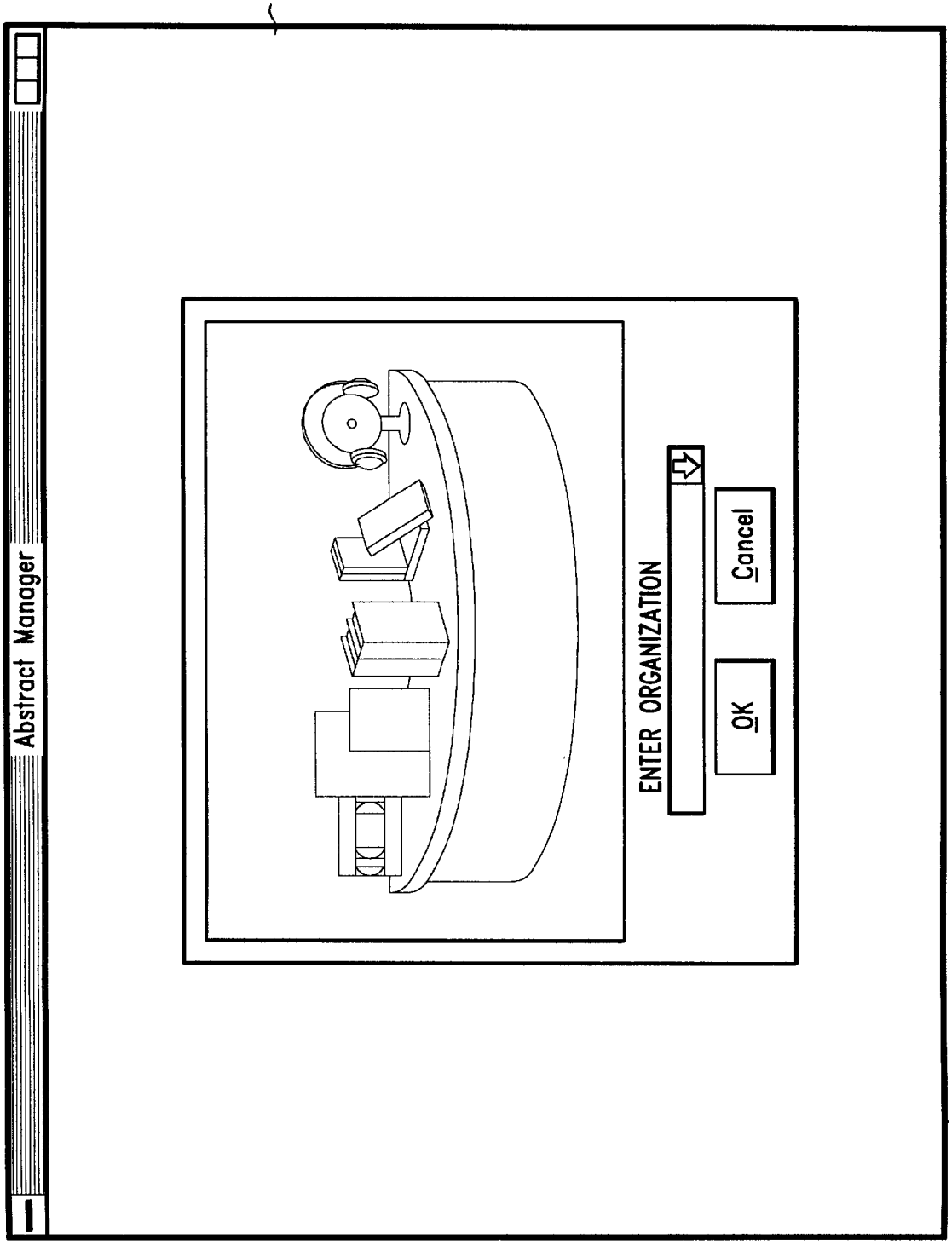
FIG. 3 is an exemplary abstract manager organization entry form of the abstract manager system.

FIG. 3 is an abstract manager organization entry form 50 of abstract manager system 12. The user of abstract manager system 12 encounters abstract manager organization entry form 50 after first executing abstract manager program 32. As shown, a user enters the user's organization or department in the organization field as shown. Before a user enters an organization or department, the user may select the down arrow located next to the organization field and a list of valid organization names will be displayed. A user may then simply select one of the valid organization or department names that are listed. After a valid organization or department has been entered, abstract manager program 32 generates an abstract manager main menu 52.

FIG. 4 illustrates an example of abstract manager main menu 52 as generated by abstract manager program 32 of abstract manager system 12. Abstract manager main menu 52 includes various buttons, selection points, and an abstract database search result window 72. Abstract manager main menu 52 allows a user to create a new abstract file by selecting create abstract button 54 and to view and update the records of previously created abstract files by searching abstract database 40 using the various selection points provided in abstract manager main menu 52.

A new abstract file may be created by selecting create abstract button 54. After create abstract button 54 is selected, an abstract input form is provided such as those shown in FIG. 5 and FIG. 6. At that time, input abstract information may be entered into the abstract input form and a new abstract file will be generated along with a corresponding record in abstract database 40. The corresponding record generated in abstract database 40 includes all of the abstract information provided in the new abstract file. When an abstract file is initially created, the user has the option of saving the abstract file as an unfinished abstract. This may occur if all of the input abstract information is not available at the time of creation. In such a case, the corresponding record generated in abstract database 40 will indicate that the abstract file corresponding to that record is an unfinished abstract. These may be retrieved later and saved as finished abstracts.

Abstract manager main menu 52 also allows a user to perform various searches of abstract database 40 by selecting the various options shown on abstract manager main menu 52. For example, a user may search abstract database 40 by first specifying the types of abstract records to choose from. A view by type option 58 is provided where a user may view the records of abstract database 40 by selecting those records that include abstracts of articles, journals, audios, videos, books, or all of the above. A user may then select from a view all abstracts button 64, a view organization's abstracts button 66, or a view unfinished abstracts button 68. View all abstracts button 64 provides all abstracts available in abstract database 40 that meet the selection criteria determined by the selection made in view by type option 58. View organization's abstracts button 66 selects all records of abstract database 40 that were created by the users organization, as indicated by an organization identification indicator 62, and that meet the selection criteria determined by the selection made in view by type option 58. View unfinished abstracts button 68 allows a user to view all unfinished abstracts created by that user's organization which meet the selection criteria indicated by view by type option 58.

Abstract database search result window 72 displays the result of the search performed in abstract database 40 after either view all abstracts button 64, view organization's abstracts button 66, or view unfinished abstracts button 68 is selected. The search results may be sorted by title or by author as selected using a sort option 60. The resulting records may be fully viewed through abstract database search result window 72 such that all of the fields of abstract database 40 may be viewed by using the horizontal scroll bar and all of the records of the search result may be viewed by using the vertical scroll bar as shown in FIG. 4.

Once an appropriate record of abstract database 40 has been located, the record may be updated by highlighting the desired record within abstract database search result window 72 and selecting an update record button 70. At such time, an abstract input form, such as those shown in FIG. 5 and FIG. 6, will be provided with all of the fields of such abstract input form being populated by the selected record. After the record has been updated, abstract manager system 12 generates a corresponding abstract file and overwrites the prior abstract file corresponding to the selected record. Abstract database 40 may be implemented using a database management program which is sold under the trademark MICROSOFT ACCESS.

A web browser button 56 is provided along a top of abstract manager main menu 52. Web browser button 56 may be selected to execute a web browser program such as that under the trademark NETSCAPE NAVIGATOR. The web browser program may be used to access and display an existing abstract file of abstract files 42. The files of abstract files 42 may be provided in HTML format.

Figure 6:
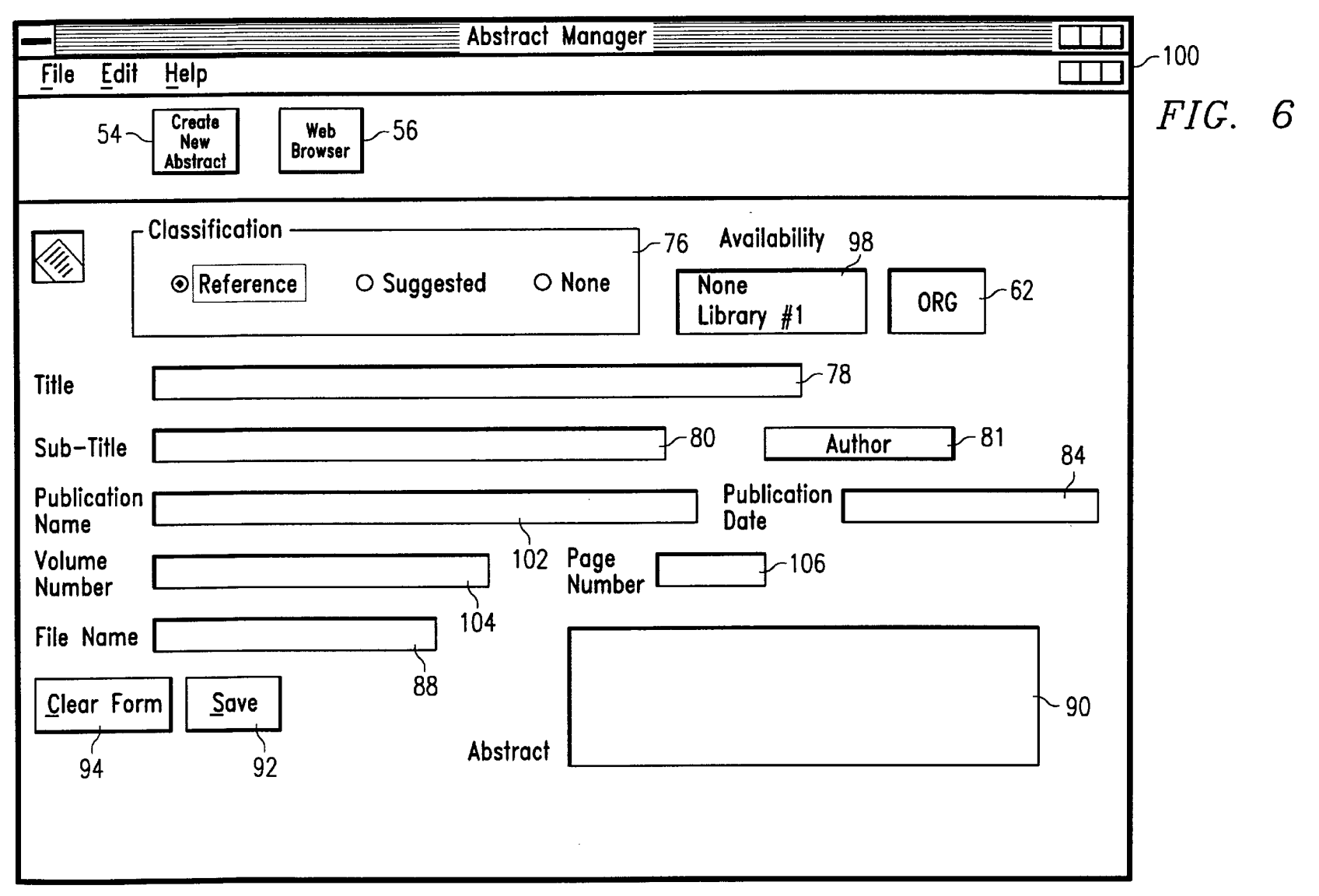

FIG. 5 is an abstract manager input form 96 for receiving input abstract information. The subject of the abstract information may be a summary or description of a book, a video, a journal, or an audio work so that a record may be generated in abstract database 40 and a corresponding abstract file may be generated. Abstract manager input form 96 is used by a user of abstract manager system 12 to receive input abstract information describing the media indicated by abstract media type option 74. If the article button, shown as an option within abstract media type option 74, is selected, an article abstract manager input form 100, as illustrated in FIG. 6, is displayed so that input abstract information pertinent to an article may be received.

Abstract manager input form 96 includes several buttons identical to those described in FIG. 4. For example, create abstract button 54, web browser button 56, and organization identification indicator 62. These buttons operate as described above with reference to FIG. 4.

Abstract manager input form 96 may be used in the following manner. A user first selects the appropriate media of the item being summarized or described. For example, the selection point to the left of "Book" will be selected if the abstract file being created is one describing a particular book. Next, the user may select an appropriate classification from a classification option 76. Classification option 76 allows the user to classify the item being described for the user's organization as a "reference," a "suggestion," or as "none." The "reference" classification is chosen if the item is not "suggested" but may be worthy of referencing if interested. The "suggested" classification is chosen if the user suggests the item for reading by the members of the user's organization. The "none" classification is chosen when the other two classification options do not apply. A library availability field 98 is provided so a user may indicate where the item is available, if known.

The user then proceeds to complete abstract manager form 96 by entering appropriate information in a title field 78, a sub-title field 80, a publisher field 82, a publication date field 84, and international standard book number (ISBN) field 86, an abstract filename field 88, and an abstract record field 90. The user inputs a brief summary or abstract of the media being reviewed in abstract record field 90. The user also selects author information input button 81 which results in another window being provided, not shown in FIG. 5. This window provides author names already stored in abstract database 40 that may be viewed and selected. By forcing a user to check if another author name has already been provided, this prevents the inconsistent usage of an author's name by ensuring that the author will be referenced in the same manner in all abstract files and records.

Abstract manager input form 96 also includes a save abstract button 92 and a clear abstract input form button 94. Clear abstract input form button 94 is used as an editing feature so that the fields of abstract manager input form 96 may be cleared. Save abstract button 92 is selected after the various fields of abstract manager input form 96 have been entered. Once save abstract button 92 has been selected, abstract manager system 12 prompts the user to either save the abstract as an "unfinished" abstract or as a "finished" abstract.

FIG. 6 is an article abstract manager input form 100 similar to abstract manager input form 96 of FIG. 5. Article abstract manager input form 100 is used to provide input abstract information so that an abstract file and corresponding record in abstract database 40 may be created. Article abstract manager input form 100 is displayed after a user selects the article button provided as an option in abstract media type option 74 of FIG. 5. Create abstract button 54, web browser button 56, organization identification indicator 62, and classification option 76 are also provided in article abstract manager input form 100 and function as previously described.

A user enters input abstract information describing a particular article into article abstract manager input form 100 by first selecting a classification option as shown in classification option 76. This is identical to the description of classification option 76 as shown in FIG. 5. Next, the pertinent article abstract information is entered into title field 78, sub-title field 80, a publication date field 84, a publication name field 102, a volume number field 104, a page number field 106, abstract filename field 88, and abstract record field 90. Also, author information input button 81 may be selected and the author or authors of the article may be entered or selected from a list of prior authors already existing in abstract database 40.

The user also selects library availability input field 98 and selects the location where the subject article may be located.

Clear abstract input form button 94 may be selected at any time to clear all the fields. Once all the information has been entered, save abstract button 92 may be selected. Just as in abstract manager input form 96, when save abstract button 92 is selected, the user is presented with the option of saving the abstract file and record as an "unfinished" abstract or as a "finished" abstract.

Figure 7:
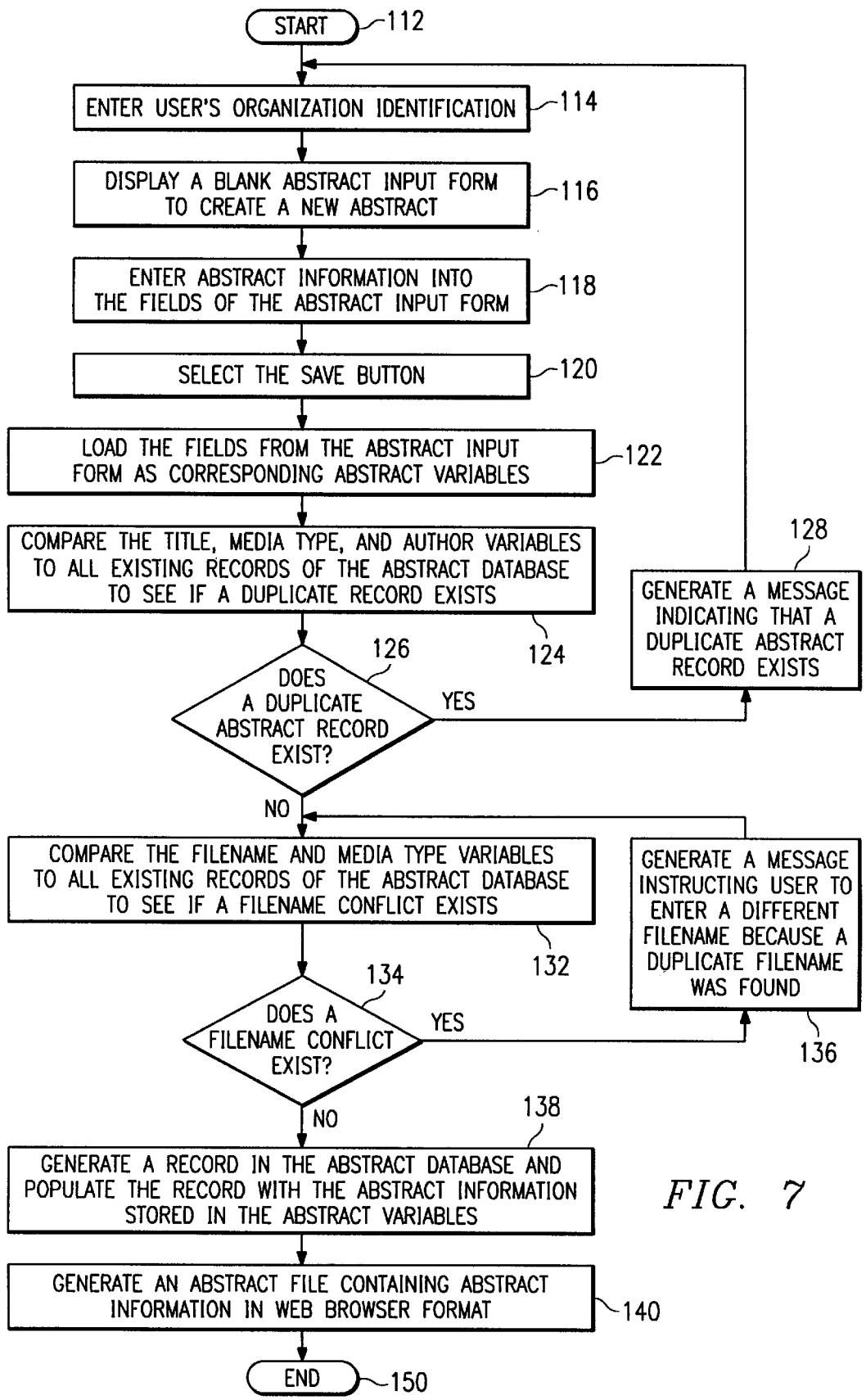
FIG. 7 is a flowchart illustrating a method for creating an abstract file.

FIG. 7 is a flowchart illustrating a method for creating an abstract file. The method begins at step 112 and proceeds to step 114 where a user enters the user's organization identification as illustrated in FIG. 3. The method then proceeds to step 116 where a blank abstract input form is generated and presented to the user. Next, the user enters the appropriate input abstract information into the various fields of the abstract input form as mentioned in step 118. In other words, input information is received from the user through an operator input apparatus, which includes the abstract manager system 12. This may include a filename that will be used to name the abstract file that will be created. The method then proceeds to step 120 where the user selects the save button after all input of the abstract information has been entered by the user.

The method proceeds next to step 122 where the input abstract information that has been provided in the various fields of the abstract input form are automatically stored as corresponding abstract variables for each input field. Next, the method proceeds to step 124 where the title, media type, and author variables are compared to all existing records stored in abstract database 40 to determine if a duplicate record exists. If a duplicate exists, decision step 126 proceeds along the "YES" branch to step 128 where a message is generated indicating to the user that a duplicate abstract record exists and the method proceeds back to step 114. If a duplicate abstract record is not found, decision step 126 proceeds along the "NO" branch to step 132 where the filename and media type variables are compared to all existing records of abstract database 40 to determine if a filename conflict exists.

The method proceeds next to decision step 134 where if a filename conflict exists, the method proceeds along the "YES" branch to step 136 where a message is generated and provided to the user that instructs the user to enter a different filename into the abstract input form because a duplicate filename was found. If a filename conflict does not exist, decision step 134 proceeds along the "NO" branch to step 138 where a record is generated in abstract database 40. The fields of the record are populated with the input abstract information stored in the abstract variables. The method then proceeds to step 140 where a corresponding abstract file is generated containing the input abstract information as previously provided. The abstract file may be provided in web browser format such as HTML format. The method ends at step 150.

FIG. 8 is a flowchart illustrating an exemplary method for generating an abstract file in web browser format as mentioned in step 140 of the method of FIG. 7. The method begins at step 162 and proceeds to step 164 where a word processing program such as that sold under the trademark MICROSOFT WORD is opened or executed. The method then proceeds to step 166 where a template is retrieved that contains predefined and placed HTML codes and MICROSOFT WORD bookmark commands throughout. Appendix A provides an example of an abstract file including the HTML codes.

The method proceeds next to step 168 where the input abstract information previously stored as various abstract variables is loaded into the template at corresponding bookmarks provided in the template. In other words, in this manner, input information is automatically combined with parser control information, such as HTML codes. The method then proceeds to step 170 where the template, with the abstract variables loaded, is saved as an abstract file. In other words, a file is generated, which contains the combined input information and parser control information. The abstract is saved using the filename provided as input abstract information and now stored as an abstract variable. MICROSOFT WORD is then closed or exited as detailed in step 172 and the method ends at step 174.

FIG. 9 is an exemplary output display of a web browser displaying an abstract file provided in HTML format.

Appendix A provides a listing of the HTML abstract file displayed in FIG. 9.

The output display of FIG. 9 provides an example of an abstract file providing a summary of a book. The title of the book is "The Fifth Discipline" and the sub-title is "The Art and Practice of The Learning Organization." As illustrated, the author's name is "Peter M. Senge" and the publisher is "New York: Doubleday/Currency." The book was published in August of 1990 and has an ISBN # of "0385260946." The book is shown as not being available. The abstract of the book is then provided in the main block of the output display.

The information provided in this abstract file may have been originally provided using abstract manager input form 96 as shown in FIG. 5. Appendix A includes all of the input abstract information shown in FIG. 9 along with the HTML code used by a web browser, such as NETSCAPE NAVIGATOR, to generate the output display in FIG. 9. The abstract file of Appendix A may have been created using the method described in FIG. 8.

FIG. 10 is a flowchart illustrating a method for viewing the records of abstract database 40. The method of FIG. 10 may be accomplished using abstract manager main menu 52 as shown and described in connection with FIG. 4. The method begins at step 182 and proceeds to step 184 where a user accesses abstract manager system 12 by entering the user's organization identification. This step was previously illustrated and discussed in connection with FIG. 3.

The method proceeds next to step 186 where the user selects the type of abstract media to be viewed. This may include viewing abstracts on articles, journals, audio works, videos, or books. After the user has selected the type of abstract media to be viewed, the method proceeds to step 188 where the user selects how the records will be sorted. For example, the records may be sorted by title or by author.

The method then proceeds to step 190 where the user selects whether to view all of the abstracts of abstract database 40, only the abstracts of the user's organization, or only the unfinished abstracts of the user's organization. Once selected, abstract manager system 12 processes the request and provides a listing of the records meeting the request criteria and the selected records may be viewed as mentioned in step 192. The step ends at step 194.

Figure 11A:
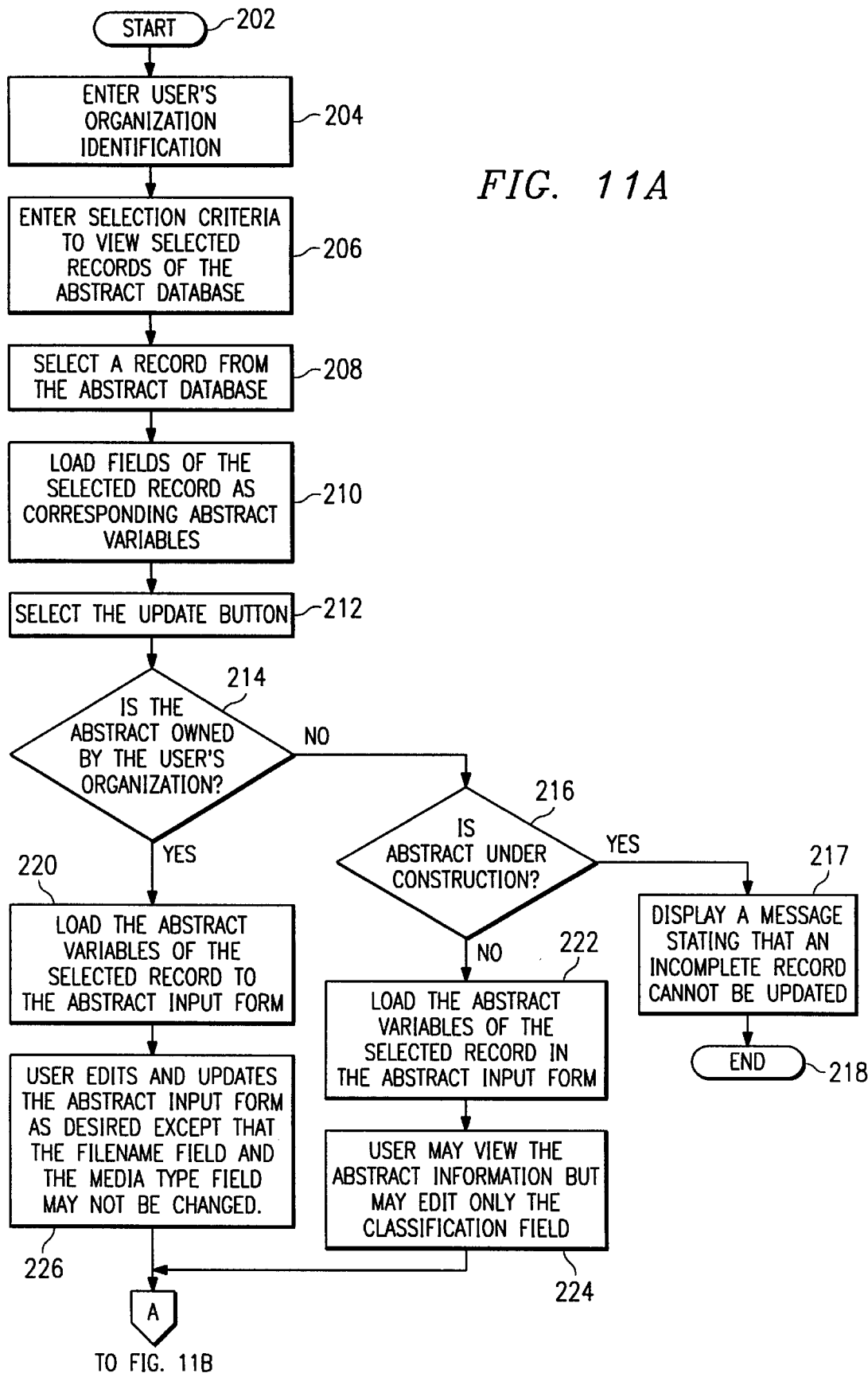
FIG. 11A–11B is a flowchart illustrating a method for updating an abstract file.
Figure 11B:
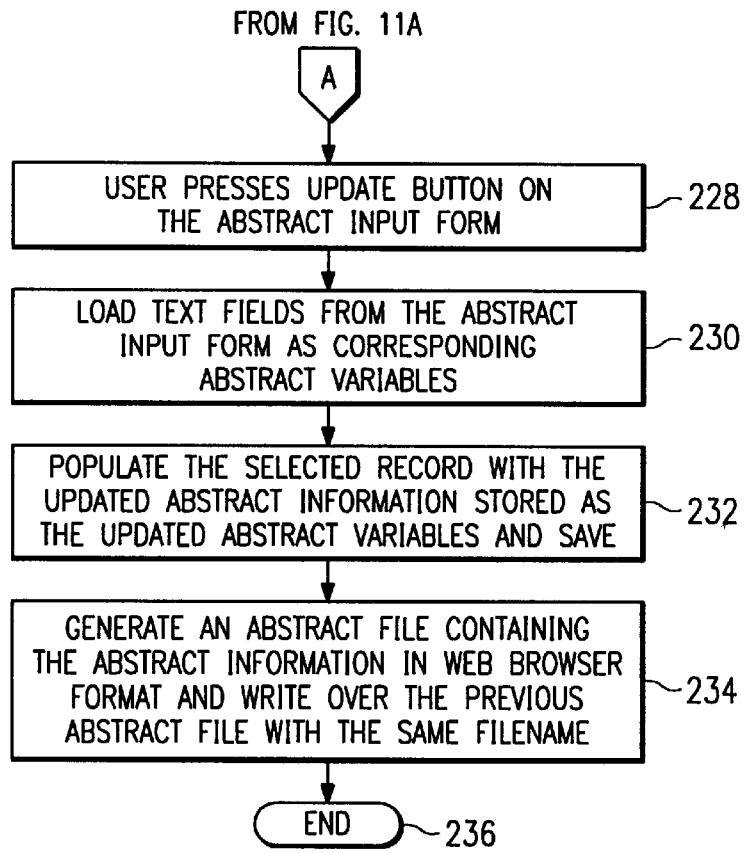

FIG. 11A–11B is a flowchart illustrating a method for updating an abstract file. The method begins at step 202 and proceeds to step 204 where a user enters the user's organization identification. The organization identification identifies the organization or department that the user belongs. This is provided so that organizations may maintain their own abstract database yet also have access to the files and records of abstracts created by other organizations. The method then proceeds to step 206 where the various selection criteria are entered and the desired records of abstract database 40 are provided. This may be performed using abstract manager main menu 52 of FIG. 4 and the method for viewing records of FIG. 10. The desired records may be viewed through abstract database search result window 72 of FIG. 4. The method then proceeds to step 208 where a record is selected from abstract database 40 and the fields of the selected record are stored as corresponding abstract variables as mentioned in step 210. The user then selects the update button as described in step 212.

The method then proceeds to decision step 214 where abstract manager system 12 compares the user's organization to the organization field of the selected record. If the user's organization is the same as the organization field of the selected record, the method proceeds along the "YES" branch of decision step 214 to step 220. Step 220 involves loading the abstract variables of the selected record to the abstract input form. The abstract input form may be similar to abstract manager input form 96 of FIG. 5 or article abstract manager input form 100 of FIG. 6. The method then proceeds to step 226 where the user edits and updates the abstract input form as desired. The filename field and the media type field may not be altered. This is to ensure that duplicate files providing the same information are not provided.

Referring back to decision step 214, if the user's organization is not the same as the organization field of the selected record, step 214 proceeds along the "NO" branch to decision step 216. Decision step 216 examines the finished field of the selected record to determine if the record was finished or unfinished when saved. Unfinished may also be referred to as "under construction." If the abstract of the selected record is still under construction, decision step 216 proceeds along the "YES" branch to step 217 where a message is displayed to the user indicating that an incomplete record cannot be updated. This is to ensure that a record or abstract that has not been completed may be completed by the person or organization that originally began the construction of the abstract or record. At this point, the method will then end at step 218.

If the abstract of the selected record is found not to be under construction in decision step 216, the method proceeds along the "NO" branch to step 222. Step 222 involves loading the abstract variables of the selected record into the abstract input form such as those illustrated in FIGS. 4 and 5. The method then proceeds to step 224 where a user may view the abstract information loaded into the abstract input form and may edit only the classification field. Only the classification options, such as classification option 76 of FIGS. 5 and 6, may be changed. This is to ensure that an organization cannot change substantive material of an abstract created by another organization. The user's organization may include its classification with the abstract file and corresponding record. The method then proceeds to step 228.

Step 228 involves the user selecting the update button on the abstract input form after all of the changes have been received. The method then proceeds to step 230 where the text fields from the abstract input form are saved as corresponding abstract variables. The method then proceeds to step 232 and the selected record is populated with the updated or edited input abstract information stored as the abstract variables previously saved in step 230. The record is then saved in abstract database 40. The method finally proceeds to step 234 where a corresponding abstract file is generated that contains the input abstract information. The abstract file may be generated in web browser format and the file will be saved with the same filename as the previous abstract file thus writing over the previous abstract file. Step 234 may be carried out using the method illustrated in FIG. 8. The method ends at step 236.

Figure 12:
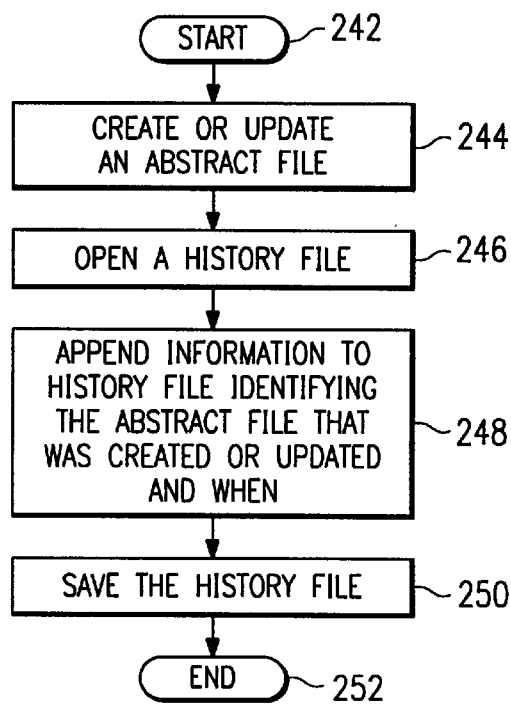
FIG. 12 is a flowchart illustrating a method for creating and updating an abstract history file.

FIG. 12 is a flowchart illustrating a method for creating and updating an abstract history file. An abstract history file is a file that records all activity, such as abstract file creations and updates, of abstract manager system 12. The method starts at step 242 and proceeds to step 244 where an abstract file is created or updated. The method then proceeds to step 246 where as a result of an abstract file being created or updated, an abstract history file is opened. This may be accomplished using a word processing program or the like. The method then proceeds to step 248 where information regarding the creation or update of an abstract file in step 244 is appended to the bottom of the abstract history file. The information identifies the abstract file that was created or updated and the time of the creation or update. The method then proceeds to step 250 where the history file is saved. The method ends at step 252. The abstract history file assists in managing a large collection of abstract files.

Thus, it is apparent that there has been provided, in accordance with the present invention, an abstract manager system and method for managing an abstract database that satisfies the advantages set forth above. Although the preferred embodiment has been described in detail, it should be understood that various changes, substitutions, and alterations can be made herein. For example, a variety of different computer systems may be used to implement the present invention, and a variety of available computer programming languages, such as VISUAL BASIC by MICROSOFT, may be used to develop one or more computer programs to practice the present invention. The present invention may be implemented on any computer, computer network, or interconnection of computers. Also, the direct interconnections illustrated herein could be altered by one skilled in the art such that two computers or devices are merely coupled to one another through an intermediate computer or device without being directly connected while still achieving the desired results demonstrated by the present invention.

Although the present invention has been described with reference to the Internet and intranet, it should be understood that the present invention is not limited to the Internet or intranet. The present invention may be practiced using any type of computer network or communication and data exchange system; the present invention is not limited to use with the Internet or with an intranet. Also, although the term web browser compatible file or information file has been used in describing the present invention, the present invention is not limited to the generation of web browser compatible files. The present invention includes the generation of any computer file that provides information and that is capable of being processed and displayed using a computer program. Such a computer program may include a parser capable of breaking large units of data into smaller more easily interpreted pieces. Finally, although the present invention has been illustrated and described with respect to the creation, update, and maintenance of abstract files containing abstract information, it should be understood that the present invention is not limited to files containing abstract information. The present invention encompasses the creation, update, and maintenance of files containing any available information content. Other examples of changes, substitutions, and alterations are readily ascertainable by one skilled in the art and could be made without departing from the spirit and scope of the present invention.

APPENDIX A

```
<title>Library - Book - The Fifth Discipline</title>
<!KEYWORD=LLC_SUGGESTED>
<!KEYWORD=>
<!KEYWORD=>
<!KEYWORD=>
<!KEYWORD=>
<!KEYWORD=BOOK>
<img src="/Images/book-abstract.gif" align=left hspace=15>
<font size=+3>The Fifth Discipline:</font><br>
<font size=+2>The Art and Practice of The Learning
Organization</font>
```

APPENDIX A -continued

```
<p>
<table border>
<tr>
<th>Author</th>
<th>Publisher</th>
<th>Publication<br>Date</th>
<th>ISBN #</th>
<th>Available?</th>
</tr>
<tr align=center>
<td>Senge, Peter M.</td>
<td>New York:<br>Doubleday/Currency</td>
<td>August, 1990</td>
<td>0385260946</td>
<td>No</td>
</tr>
</table>
<br clear=left>
<hr>
<img src="/Images/lock.gif" align=left> <a
href="news://news.knet.eds.com/edsolc.shared.books"><img
src="/Images/comments.gif" align=left></a>
Share your thoughts about this book in a secured
discussion. This discussion is only open to authorized
participants.
<br clear=left>
<hr>
<h3 >Abstract</h3> .
This book discusses the following topics:
<ul>
<li>Organizational effectiveness
<li>Work groups
<li>Organization and administration
<li>Efficiency
<li>Learning
</ul>
<p>
Its theme is that corporations must become learning
organizations to survive and prosper, yet many operate with
'learning disabilities' that block survival and growth.
The book offers ways leaders can eliminate or seek to
eliminate those learning disabilities through mastery of
five disciplines: personal mastery, mental models, shared
vision, team learning, and systems thinking.
<hr>
<!--#include virtual="/Library/books/footer.html" -->
```

What is claimed is:

1. A computerized method for processing information, comprising the steps of:

receiving input information from an operator through an operator input apparatus;

automatically combining the input information with further information, the further information being in a format understandable by a parser;

generating a file which contains the combined input information and further information, the file being in a format understandable by a parser;

storing the file in a storage medium which is accessible to a network; and providing a predefined template which includes the further information in a predetermined format;

wherein said step of automatically combining is carried out by inserting the input information into the predefined template at a predetermined location therein.

2. A computerized method according to claim 1, including the step of maintaining in the storage medium a plurality of files which each conform to the predefined template, which each have the further information therein in the predetermined format, and which each have respective different input information therein at the predetermined location in the predefined template.

3. A computerized method according to claim 1,
wherein the input information includes a plurality of items of information; and
wherein said step of automatically combining is carried out by inserting each of the items of input information into the predefined template at a respective predetermined location therein.

4. A computerized method according to claim 1,
including the step of providing a plurality of predefined templates which each include information in a respective predetermined format that is understandable by a parser;
including the step of allowing an operator to select one of the predefined templates; and
wherein said step of automatically combining is carried out by inserting the input information into the selected template at a predetermined location therein.

5. A computerized method according to claim 1, wherein said input information includes an abstract relating to material external to the file containing the input information.

6. A computerized method according to claim 5, wherein said abstract includes identification of at least one item from the set consisting of: an author, a title, a publisher, a publication, a publication date, a volume number, a page number, a summary, a media type, availability information, classification information, status information, and organization identification information.

7. A computerized method according to claim 1, wherein said further information is in a hypertext mark-up language format.

8. A computerized method according to claim 1,
including the step of maintaining in the storage medium a plurality of files which each conform to the predefined template;
including the step of maintaining in the storage medium a database having a plurality of records which each correspond to a respective one of the files and which each contain the input information from the corresponding file; and
including after said receiving step the step of creating in the database a record which includes the input information received during said receiving step.

9. A computerized method according to claim 8, including the steps of:
selecting and retrieving a record from the database;
displaying the input information from the retrieved record on a display of the operator input apparatus;
altering the displayed input information in response to further operator input from the operator input apparatus;
storing the updated input information in the selected record of the database;
automatically combining the updated input information with the further information;
generating a file which contains the combined updated input information and further information, and which is in a format understandable by a parser; and
storing in the storage medium, in place of the file corresponding to the selected record, the file which contains the combined updated input information and further information.

10. A computerized method according to claim 8, including the further steps of:
accepting search criteria from the operator through the operator input apparatus;
searching the database for records which meet the search criteria; and
displaying a list of the records which met the search criteria during said searching step.

11. A computerized method for processing information, comprising the steps of:
receiving input information from an operator through an operator input apparatus;
automatically combining the input information with further information, the further information being in a format understandable by a parser;
generating a file which contains the combined input information and further information, the file being in a format understandable by a parser; and
storing the file in a storage medium which is accessible to a network;
wherein said receiving step includes the steps of:
displaying an input form on a display of the operator input apparatus; and
displaying the input information entered by the operator at a predetermined location on the input form.

12. An apparatus, comprising:
a storage medium; and
a file generator program stored on said storage medium and operative to:
receive input information entered by an operator;
automatically combine the input information with further information, the further information being in a format understandable by a parser;
generate a file which contains the combined input information and further information, the file being in a format understandable by a parser;
store the file in a storage device;
effect the combining of the input information with the further information by inserting the input information at a predetermined location in a predefined template, the predefined template including the further information in a predetermined format; and
maintain in the storage medium a plurality of files which each conform to the predefined template, which each have therein the further information in the predetermined format, and which have respective different input information therein at the predetermined location in the template.

13. An apparatus according to claim 12, wherein said program is further operative to:
maintain is the storage medium a database which includes a plurality of records each corresponding to a respective one of the files stored in said storage medium, each of the records having therein the input information from the corresponding file.

* * * * *